United States Patent
Salamah et al.

(10) Patent No.: US 7,808,135 B2
(45) Date of Patent: Oct. 5, 2010

(54) GENERATOR HAVING A COOLING FLOW BIFURCATION MEMBER AND METHOD FOR CONTROLLING A COOLING FLOW

(75) Inventors: Samir Armando Salamah, Niskayuna, NY (US); Richard Nils Dawson, Voorheesville, NY (US); Sandip Hirade, Maharashtra (IN); Rebinth J Robin, Karnataka (IN)

(73) Assignee: General Electric Company, Schenectady, NY (US)

( * ) Notice: Subject to any disclaimer, the term of this patent is extended or adjusted under 35 U.S.C. 154(b) by 136 days.

(21) Appl. No.: 11/857,184

(22) Filed: Sep. 18, 2007

(65) Prior Publication Data
US 2009/0072641 A1    Mar. 19, 2009

(51) Int. Cl.
*H02K 9/00* (2006.01)
*H02K 1/20* (2006.01)

(52) U.S. Cl. .............................. 310/59; 310/52; 310/53; 310/55; 310/58

(58) Field of Classification Search .................. 310/52, 310/53, 55, 58, 59; *H02K 9/00, 1/20*
See application file for complete search history.

(56) References Cited

U.S. PATENT DOCUMENTS

| | | | | |
|---|---|---|---|---|
| 4,051,400 A | * | 9/1977 | Armor et al. | 310/58 |
| 6,232,682 B1 | * | 5/2001 | Hall | 310/52 |
| 6,727,610 B2 | | 4/2004 | Ren et al. | |
| 7,557,475 B2 | * | 7/2009 | Robin et al. | 310/58 |
| 2004/0263008 A1 | * | 12/2004 | Voigt et al. | 310/58 |
| 2008/0048511 A1 | * | 2/2008 | Robin et al. | 310/58 |

FOREIGN PATENT DOCUMENTS

| | | | |
|---|---|---|---|
| GB | 2 441 629 | | 3/2008 |
| JP | 58123349 A | * | 7/1983 |
| JP | 05022900 A | * | 1/1993 |

OTHER PUBLICATIONS

JP 58123349_EN_AB.pdf : Ono (JP 58123349, English abstract), 1983.*
JP 58-123349_AB.pdf : Ono (JP 58-123349, with English abstract, 1983).*
aerodynamic.pdf - NPL (http://en.wikipedia.org/wiki/Aerodynamics) (no date).*
GB Search Report; Application No. GB0816910.4; Date of Search: Jan. 21, 2009; p. 1.

* cited by examiner

*Primary Examiner*—Quyen Leung
*Assistant Examiner*—John K Kim
(74) *Attorney, Agent, or Firm*—Cantor Colburn LLP

(57) ABSTRACT

A cooling flow bifurcation member is positioned in an outside radial flow passage of a generator between an end portion of a stator core and a stator flange. The flow bifurcation member includes a main body portion having a tapered surface that transforms a first flow having a first velocity passing into the outside radial flow passage into at least one other flow having another velocity. The at least one other flow is directed along at least one of an outer surface of the end portion of the stator core and the stator flange.

14 Claims, 2 Drawing Sheets

GENERATOR HAVING A COOLING FLOW BIFURCATION MEMBER AND METHOD FOR CONTROLLING A COOLING FLOW

BACKGROUND OF THE INVENTION

The present invention relates to the art of generators and, more particularly, to a device that guides ventilation gas about a stator flange portion of a generator.

During the process of producing electricity, power generators also create heat that must be dissipated away from the generator. Many known generators use fluid cooling to dissipate this heat. In many known generators, the fluid is a gas. Known gas-cooled generators are cooled by ventilated cooling systems that circulate a cooling gas through ducts provided in various components such as a rotor and a stator core.

In some known gas-cooled generators, the stator core is constructed by stacking many layers of magnetic laminations, also known as stator punchings. The laminations are held together by a stator flange positioned on opposing ends of the stator core. Ventilating ducts are defined between the stacked layers of magnetic laminations by providing spacers or inside spacing blocks in the core stack. The passages allow cooling gas to pass through the stator core. The spacers are positioned in such a way so as to ensure tightness of the stator core during assembly and operation, and to avoid blocking or restricting the flow of cooling gas through the stator core. Outside spacing blocks are located at the end portions of the stator core and define a passage or ventilation duct which allows the cooling gas to flow between the stacked laminations and stator flange.

During operation, the stator flange(s) is exposed to heat generated as a result of electromagnetic fluxes flowing from an end winding and axial fluxes from the stator core. Material considerations limit the maximum temperature to which the stator flange can be exposed. If proper cooling is not provided at the stator flange, adjacent insulation may fail and cause a malfunction of the generator. Thus, flange cooling may be required so that heat generated on the flange can be dissipated in a cooling medium.

BRIEF DESCRIPTION OF THE INVENTION

In accordance with one aspect of the invention, a flow bifurcation member is provided. The flow bifurcation member is positioned in an outside radial flow passage of a generator, between an end portion of a stator core and a stator flange. The flow bifurcation member includes a tapered surface that transforms a first flow having a first velocity passing into the outside radial flow passage into at least one other flow having another velocity. The at least one other flow is directed along at least one of the outer surface of the end portion of the stator core and the stator flange.

In accordance with another aspect of the invention, a generator is provided. The generator includes a rotor and a stator core concentrically disposed about the rotor. The stator core includes a plurality of stacked laminations having at least one end portion including an outer surface. The generator further includes a stator flange mounted adjacent the at least one end portion of the stacked lamination so as to define an outside radial flow passage. The generator is also provided with a flow bifurcation member having a tapered surface that transforms a first flow having a first velocity passing into the outside radial flow passage into at least one other flow having another velocity. The at least one other flow is directed along at least one of the outer surface of the end portion of the stator core and the stator flange.

In accordance with yet another aspect, the present invention provides a method of cooling portions of a power generator having a stator flange, a stator core including an end portion, and a flow bifurcation member positioned between the stator flange and the end portion of the stator core. The method includes directing a first flow having a first velocity into an outside radial flow passage defined between the stator flange and the end portion of the stator core. The method further requires guiding the first flow into the flow bifurcation member which transforms the first flow into at least one other flow having another velocity. The other flow is accelerated and passed along at least one of the end portion of the stator and the stator flange.

The various aspects of the present invention provide improved cooling to portions of a generator such as a stator flange portion of the generator. By reducing temperatures at the stator flange, power output and the overall efficiency of the generator is increased without detrimentally affecting insulation on adjacent components. In any event, additional objects, features and advantages of the various aspects of the present invention will become more readily apparent from the following detailed description of a preferred embodiment when taken in conjunction with the drawings wherein like reference numerals refer to corresponding parts in the several views.

DETAILED DESCRIPTION OF THE INVENTION

Figure 1:
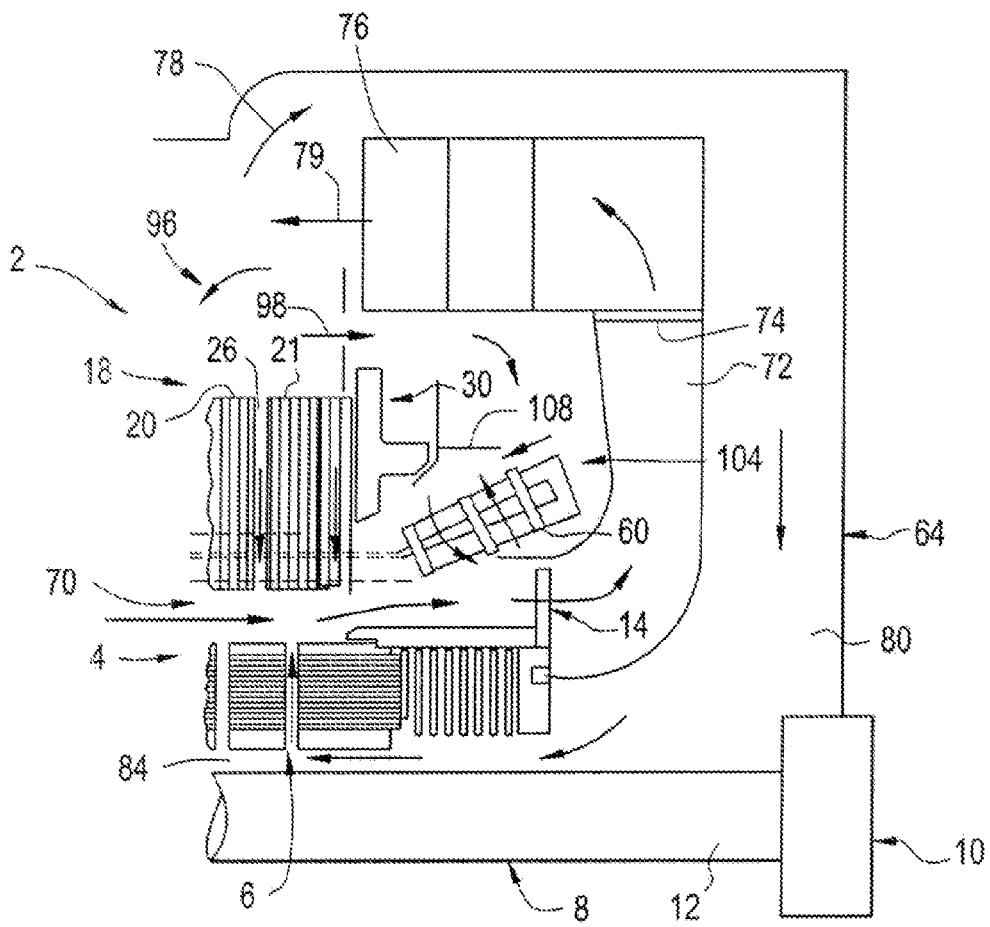
FIG. 1 is a partial cross-sectional side view of an end portion of a gas cooled generator constructed in accordance with an aspect of the present invention.

With initial reference to FIG. 1, a generator constructed in accordance with one aspect of the present invention is generally indicated at 2. Generator 2 includes a rotor 4 including a plurality of cooling gas or ventilation passages, one of which is indicated at 6. Rotor 4 extends circumferentially about a shaft 8 that is rotatably supported by a bearing 10 at an end portion 12 thereof. Of course it should be readily understood that shaft 8 is also rotatably supported at an opposing end portion (not shown). A fan assembly 14 is mounted to shaft 8 adjacent rotor 4. Fan assembly 14 generates a cooling gas flow as will be discussed more fully below.

Generator 2 also includes a stator core 18 formed from a plurality of laminations, two of which are indicated at 20 and 21. Laminations 20 and 21 are spaced one from the other by an inside spacing block (ISSB) (not shown) that establishes an inside radial flow passage or ventilation duct 26. Of course it should be readily appreciated that stator core 18 includes a number of stacked laminations spaced from one another by corresponding inside spacing blocks (not shown) that establish additional ventilation ducts (also not shown).

In any event, stator core 18 also includes a stator flange 30 that ensures a tightness of the plurality of laminations. That is, the plurality of laminations are tightly packed between flange 30 and an opposing flange (not shown). In the embodiment shown, flange 30 includes a main body portion 32 having a first end portion 33, a second end portion 34 and an intermediate portion 35 that collectively define an inner surface 38 and an outer surface 40. Flange 30 is also shown to include a projection 44 that extends substantially perpendicularly outward from outer surface 40. Flange 30 is spaced from an outer surface 46 of end most lamination 21 by an outside spacing block assembly (OSSB) 50 so as to define an outside radial flow passage 52 having a first effective flow area.

In operation, electromagnetic flux from a stator end winding 60 and an axial flux from stator core 18 impinge on flange 30. The fluxes generate a significant amount of heat which raises temperatures of rotor 4, stator core 18, stator end winding 60 stator flange 30 as well as other components of generator 2. In order to reduce these temperatures, generator 2 is provided with a cooling gas ventilation system 64. More specifically, fan assembly 14 draws a gas or air stream through a passage 70 that extends longitudinally between rotor 4 and stator core 18. The gas stream exits fan assembly 14 into a high pressure hot gas duct 72 before passing through a diffuser 74 and into a heat exchanger 76. From heat exchanger 76 first and second cooling gas streams 78 and 79 pass back into generator 2. First cooling gas stream 78 passes into a low pressure, cold gas duct 80 before flowing into a ventilation passage 84 that extends longitudinally between rotor 4 and shaft 8. First cooling gas stream 78 then passes through ventilation passages 6 in rotor 4 and back into passage 70.

Figure 2:
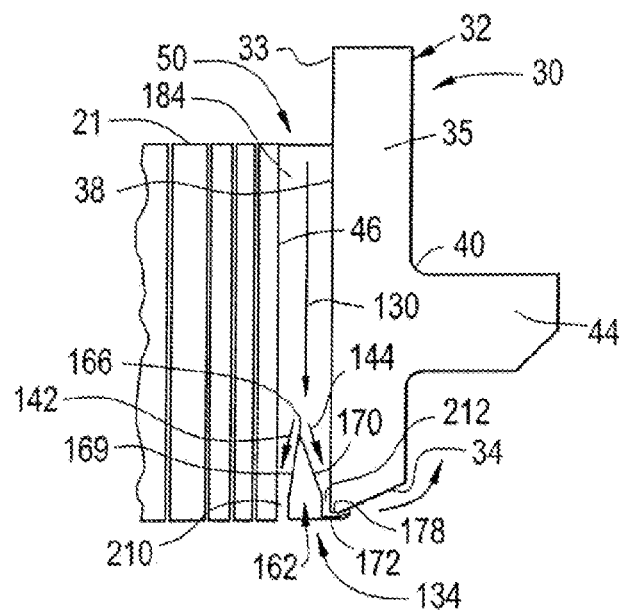
FIG. 2 is a cross-sectional plan view of a stator flange portion of the gas cooled generator of FIG. 1.

Second cooling gas stream 79 splits into a first cooling flow portion 96 and a second cooling flow portion 98. First cooling flow portion 96 passes over stator core 18 and through inside radial flow passage(s) 26 before re-entering passage 70. Second cooling flow portion 98 passes into an end winding bay or chamber 104 to cool stator end winding 60. More specifically, upon entering end winding bay 104, second cooling flow portion 98 is directed by a baffle 108 around stator end winding 60. Baffle 108 causes second cooling flow portion 98 to take a circuitous path about stator end winding 60 and remove any built up heat before being drawn back through fan assembly 14. Second cooling gas stream 79 also splits into a third cooling flow portion 130 having a first velocity which, as best shown in FIG. 2, passes into outside radial flow passage 52.

Figure 3:
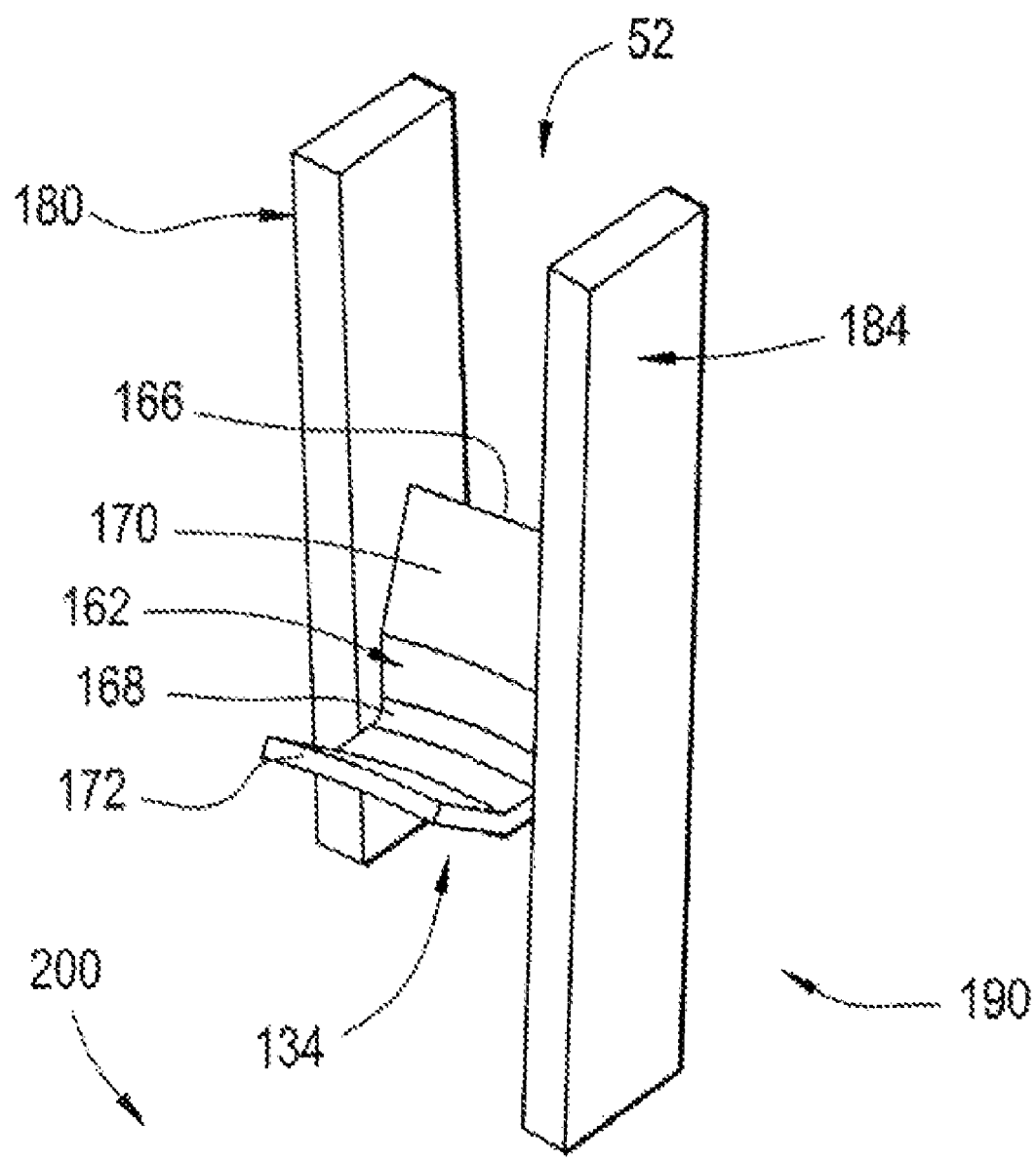
FIG. 3 is an upper left perspective view of a bifurcation member constricted in accordance with an aspect of the present invention.

In accordance with an aspect of the invention, third cooling flow portion 130 of second cooling gas stream 79 impacts a flow bifurcation member 134 which bifurcates or splits third cooling flow portion 130 into a first bifurcated flow portion 142 having a second velocity and a second bifurcated flow portion 144 having a third velocity. First bifurcated flow portion 142 flows along outer surface 46 of lamination 21 while second bifurcated flow portion 144 flows along inner surface 38 of flange 30. As best shown in FIG. 3, flow bifurcation member 134 includes a main body portion 162 having an upper tapered portion 166 and a lower portion 168. Upper tapered portion 166 includes first and second inclined or tapered surfaces 169 and 170 while lower portion 168 is provided with a flow deflector 172 that guides second bifurcated portion 144 around a tip portion 178 of flange 30.

In the embodiment shown, flow bifurcation member 134 is positioned between first and second outside spacing block members 180 and 184 that establish an outside spacing block segment 190. Projected around an axis defined by a point 200 outside spacing block segment 190 forms outside spacer block assembly 50, with adjacent outside spacing block members, such as members 180 and 184, establishing a respective outside radial flow passage 52. With this arrangement, once outside spacing block assembly 50 is positioned between stator core 18 and stator flange 30, flow bifurcation member 134 creates a first flow passage 210 having a second effective now area that extends along outside surface 46 of lamination 21 and a second flow passage 212 having a third effective flow area that extends along outer surface 40 of flange 30.

Each of the second and third effective flow areas are significantly smaller than the first effective flow area of the outside radial flow passage 52. In this manner, the physics of first and second bifurcated flow portions 142 and 144 is significantly altered relative to third cooling flow portion 130. That is, the smaller effective flow area cause an increase in the second and third velocities of first and second bifurcated flow portions 142 and 144 relative to the first velocity of third flow portion 130. The increase in flow velocity advantageously increases heat transfer between stator core 18 and first bifurcated flow portion 142 and flange 30 and second bifurcated flow portion 144 and significantly reduce temperatures. That is, evidence has shown that the presence of flow bifurcation member 134 in conjunction with lower portion 168 and flow deflector 172 will reduce temperatures at stator flange 30 by as much as 60° C. or more.

Although described with reference to illustrated aspects of the present invention, it should be readily understood that various changes and/or modifications can be made to the invention without departing from the spirit thereof. For instance, the stator flange employed in connection with the present invention can be easily replaced by other stator flanges having various shapes and sizes. In addition, the overall shape and geometry of flow bifurcation member 134 be readily varied. In general the invention is only intended to be limited by the scope of the following claims.

The invention claimed is:

1. A cooling flow bifurcation member positioned in an outside radial flow passage of a generator between an end portion of a stator core and a first surface of a stator flange, the member comprising:
    a main body portion having a surface that transforms a first flow having a first velocity passing through the outside radial flow passage into at least one other flow having another velocity, said at least one other flow being directed along at least one of an outer surface of the end portion of the stator core and a second surface of the stator flange.

2. The cooling flow bifurcation member according to claim 1, wherein the at least one other flow includes a second flow having a second velocity and a third flow having a third velocity, said second flow being directed along the outer surface of the end portion of the stator core and the third flow being directed along the stator flange.

3. The cooling flow bifurcation member according to claim 2, wherein the surface of the main body portion is a tapered surface.

4. The cooling flow bifurcation member according to claim 3, wherein the tapered surface includes first and second inclined surfaces.

5. The cooling flow bifurcation member according to claim 2, wherein the main body portion includes a deflector member that guides the third flow around a lower portion of the stator flange.

6. The cooling flow bifurcation member according to claim 2, wherein each of the second and third velocities is higher than the first velocity.

7. A generator comprising:
    a rotor;
    a stator core concentrically disposed about the rotor, said stator core including a plurality of stacked laminations having at least one end portion including an outer surface;
    a stator flange mounted adjacent the at least one end portion, the stator flange including a first surface that defines an outside radial flow passage and a second surface; and a flow bifurcation member having a surface that transforms a first flow having a first velocity passing through the outside radial flow passage into at least one other flow having another velocity, said at least one other flow being directed along at least one of the outer surface of the end portion of the stator core and the second surface of the stator flange.

8. The generator according to claim 7, wherein the at least one other flow includes a second flow having a second velocity and a third flow having a third velocity, said second flow being directed along the outer surface of the end portion of the stator core and said third flow being directed along the stator flange.

9. The generator according to claim 8, wherein the surface of the flow bifurcation member includes a tapered surface.

10. The generator according to claim 9, wherein the tapered surface includes first and second inclined surfaces.

11. The generator according to claim 8, wherein the flow bifurcation member includes a deflector member that guides the third flow around a lower portion of the flange.

12. The generator according to claim 8, wherein the second and third velocities are higher than the first velocity.

13. The generator according to claim 8, further comprising:

a first flow passage extending between the outer surface of the end portion of the stator core and the flow bifurcation member; and a second flow passage extending between the stator flange and the flow bifurcation member, said second flow passing into the first flow passage and said third flow passing into the second flow passage.

14. The generator according to claim 13, wherein the outside radial flow passage has a first effective flow area, the first flow passage has a second effective flow area and the second flow passage includes a third effective flow area, said second and third effective flow areas being smaller than the first effective flow area.

\* \* \* \* \*